US012798579B2

(12) United States Patent
Kuroda

(10) Patent No.: US 12,798,579 B2
(45) Date of Patent: Nov. 17, 2026

(54) VEHICLE CONTROLLER, METHOD, AND COMPUTER PROGRAM FOR VEHICLE CONTROL

(71) Applicant: TOYOTA JIDOSHA KABUSHIKI KAISHA, Toyota (JP)

(72) Inventor: Ryusuke Kuroda, Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 55 days.

(21) Appl. No.: 18/987,749

(22) Filed: Dec. 19, 2024

(65) Prior Publication Data

US 2025/0214583 A1 Jul. 3, 2025

(30) Foreign Application Priority Data

Dec. 27, 2023 (JP) ................................ 2023-221450

(51) Int. Cl.
*B60W 30/16* (2020.01)
*B60W 60/00* (2020.01)

(52) U.S. Cl.
CPC .......... *B60W 30/16* (2013.01); *B60W 60/001* (2020.02); *B60W 2420/403* (2013.01); *B60W 2554/4026* (2020.02); *B60W 2554/802* (2020.02)

(58) Field of Classification Search
CPC .............. B60W 30/16; B60W 60/001; B60W 2420/403; B60W 2554/4026; B60W 2554/802; B60W 30/09; B60W 30/0956
See application file for complete search history.

(56) References Cited

U.S. PATENT DOCUMENTS

| | | | | |
|---|---|---|---|---|
| 4,953,305 | A * | 9/1990 | Van Lente | G01C 17/38 700/79 |
| 10,227,105 | B2 * | 3/2019 | Michael | B62K 25/286 |
| 11,887,475 | B1 * | 1/2024 | Riggs | G08G 1/09623 |
| 2011/0234761 | A1 * | 9/2011 | Yumiba | G06T 3/12 348/46 |
| 2015/0191176 | A1 * | 7/2015 | Kobana | B60W 40/08 701/70 |
| 2015/0329044 | A1 * | 11/2015 | Bernstein | G08G 1/165 340/435 |
| 2017/0183003 | A1 | 6/2017 | Ohmura | |
| 2018/0326982 | A1 * | 11/2018 | Paris | B60W 30/0956 |
| 2019/0086550 | A1 * | 3/2019 | Dussan | G02B 26/108 |

(Continued)

FOREIGN PATENT DOCUMENTS

| | | |
|---|---|---|
| JP | 2009-122854 A | 6/2009 |
| JP | 2015-014948 A | 1/2015 |

(Continued)

*Primary Examiner* — Mussa A Shaawat
(74) *Attorney, Agent, or Firm* — Dinsmore & Shohl LLP

(57) ABSTRACT

A vehicle controller includes a processor configured to detect a cycle traveling in an area around a vehicle, based on an image representing the area around the vehicle, determine whether the cycle may exhibit swaying behavior, based on an object region representing the cycle detected in the image, set an offset distance to the cycle in a direction perpendicular to a lengthwise direction of a road being traveled by the vehicle so that the offset distance when the cycle may exhibit swaying behavior is greater than the offset distance when the cycle will not exhibit swaying behavior, and control travel of the vehicle to keep at least the set offset distance from the cycle.

8 Claims, 4 Drawing Sheets

(56) References Cited

U.S. PATENT DOCUMENTS

| | | | | |
|---|---|---|---|---|
| 2019/0211587 | A1* | 7/2019 | Ganeshan | B60Q 5/006 |
| 2019/0299985 | A1* | 10/2019 | Toda | B60W 10/06 |
| 2020/0401820 | A1* | 12/2020 | Nagata | G06T 7/20 |
| 2021/0300362 | A1* | 9/2021 | Yasui | B60W 10/20 |
| 2022/0297714 | A1* | 9/2022 | Tsugawa | G06V 20/597 |
| 2023/0176573 | A1* | 6/2023 | Kumavat | G05D 1/0027 701/23 |
| 2023/0339495 | A1* | 10/2023 | Nagasawa | B60W 40/02 |
| 2023/0347905 | A1* | 11/2023 | Nagasawa | B60W 30/143 |
| 2023/0356728 | A1* | 11/2023 | Jain | G06F 3/013 |
| 2024/0383478 | A1* | 11/2024 | Tanaka | B60W 30/18159 |
| 2025/0083674 | A1* | 3/2025 | Adachi | B60W 30/146 |
| 2025/0382027 | A1* | 12/2025 | Pfau | B60W 30/16 |

FOREIGN PATENT DOCUMENTS

| | | | |
|---|---|---|---|
| JP | 2017-117157 | A | 6/2017 |
| JP | 2019-185113 | A | 10/2019 |
| JP | 2019-191982 | A | 10/2019 |
| JP | 2021-157403 | A | 10/2021 |

* cited by examiner

VEHICLE CONTROLLER, METHOD, AND COMPUTER PROGRAM FOR VEHICLE CONTROL

CROSS-REFERENCE TO RELATED APPLICATIONS

This application claims priority to Japanese Patent Application No. 2023-221450 filed Dec. 27, 2023, the entire contents of which are herein incorporated by reference.

FIELD

The present disclosure relates to a vehicle controller, a method, and a computer program for vehicle control.

BACKGROUND

A technique of driving control of a host vehicle based on the result of recognition of a two-wheeler traveling ahead of the host vehicle has been researched (see Japanese Unexamined Patent Publication JP2019-185113A).

A vehicle controller described in JP2019-185113A determines that a two-wheeler is probably swaying, when the maximum amount of change in the lateral position of the two-wheeler in a predetermined distance is not less than a threshold. Then the vehicle controller sets an offset distance from a bicycle lane being traveled by the two-wheeler to a greater value so as to move the host vehicle away from the two-wheeler.

SUMMARY

In the above-described technique, the offset distance is adjusted based on the amount of change in the lateral position of a two-wheeler, and thus will not be set to a large value for a two-wheeler that has not particularly swayed so far. However, a two-wheeler, such as a cycle, may suddenly lean toward a lane being traveled by the vehicle, depending on the two-wheeler rider.

It is an object of the present disclosure to provide a vehicle controller that can appropriately set a lateral offset distance to a cycle traveling in an area around the vehicle.

According to an embodiment, a vehicle controller is provided. The vehicle controller includes a processor configured to: detect a cycle traveling in an area around a vehicle, based on an image representing the area around the vehicle, determine whether the cycle may exhibit swaying behavior, based on an object region representing the cycle detected in the image, set an offset distance to the cycle in a direction perpendicular to a lengthwise direction of a road being traveled by the vehicle so that the offset distance when the cycle may exhibit swaying behavior is greater than the offset distance when the cycle will not exhibit swaying behavior, and control travel of the vehicle to keep at least the set offset distance from the cycle.

In an embodiment, the processor detects the object region representing the cycle in the image by inputting the image into a first classifier that has been trained to detect the cycle from the image, and determines whether the cycle may exhibit swaying behavior by inputting the object region into a second classifier that has been trained to determine the possibility that the cycle will exhibit swaying behavior.

In this case, the processor may determine whether the cycle may exhibit swaying behavior by inputting the object region and information representing a topographic feature of the road being traveled by the vehicle into the second classifier.

In an embodiment, the processor detects the object region representing the cycle in the image and determines whether the cycle may exhibit swaying behavior, by inputting the image into a third classifier that has been trained to detect the cycle represented in the image and to determine the possibility that the cycle will exhibit swaying behavior.

In an embodiment, the processor adjusts the offset distance, based on a topographic feature of the road being traveled by the vehicle.

In this case, the processor may adjust the offset distance so as to be increased by a predetermined distance, when the road being traveled by the vehicle is a slope or a curve.

According to another embodiment, a method for vehicle control is provided. The method includes detecting a cycle traveling in an area around a vehicle, based on an image representing the area around the vehicle; determining whether the cycle may exhibit swaying behavior, based on an object region representing the cycle detected in the image; setting an offset distance to the cycle in a direction perpendicular to a lengthwise direction of a road being traveled by the vehicle so that the offset distance when the cycle may exhibit swaying behavior is greater than the offset distance when the cycle will not exhibit swaying behavior; and controlling travel of the vehicle to keep at least the set offset distance from the cycle.

According to still another embodiment, a non-transitory recording medium that stores a computer program for vehicle control is provided. The computer program includes instructions causing a processor mounted on a vehicle to execute a process including detecting a cycle traveling in an area around the vehicle, based on an image representing the area around the vehicle; determining whether the cycle may exhibit swaying behavior, based on an object region representing the cycle detected in the image; setting an offset distance to the cycle in a direction perpendicular to a lengthwise direction of a road being traveled by the vehicle so that the offset distance when the cycle may exhibit swaying behavior is greater than the offset value when the cycle will not exhibit swaying behavior; and controlling travel of the vehicle to keep at least the set offset distance from the cycle.

The vehicle controller according to the present disclosure has an effect of being able to appropriately set a lateral offset distance to a cycle traveling in an area around the vehicle.

DESCRIPTION OF EMBODIMENTS

A vehicle controller, a method for vehicle control executed by the vehicle controller, and a computer program for vehicle control will now be described with reference to the attached drawings. The vehicle controller detects a cycle traveling in an area around a vehicle, based on an image representing the area around the vehicle, and determines whether the cycle represented in the image may exhibit swaying behavior. When it is determined that the cycle may exhibit swaying behavior, the vehicle controller sets an offset distance to the cycle in a direction perpendicular to a lengthwise direction of a road being traveled by the vehicle (hereafter a "lateral direction") to a greater value than when it is determined that the cycle will not exhibit swaying behavior. In this way, the vehicle controller sets a lateral offset distance to a cycle appropriately even if the cycle is not actually exhibiting swaying behavior.

In the present embodiment, a cycle is not limited to a two-wheeler, and may be a bicycle with training wheels, such as one for a little child, or a tricycle for an elderly person or a little child. The cycle may be a power assisted bicycle with a motor or the like.

Figure 1:
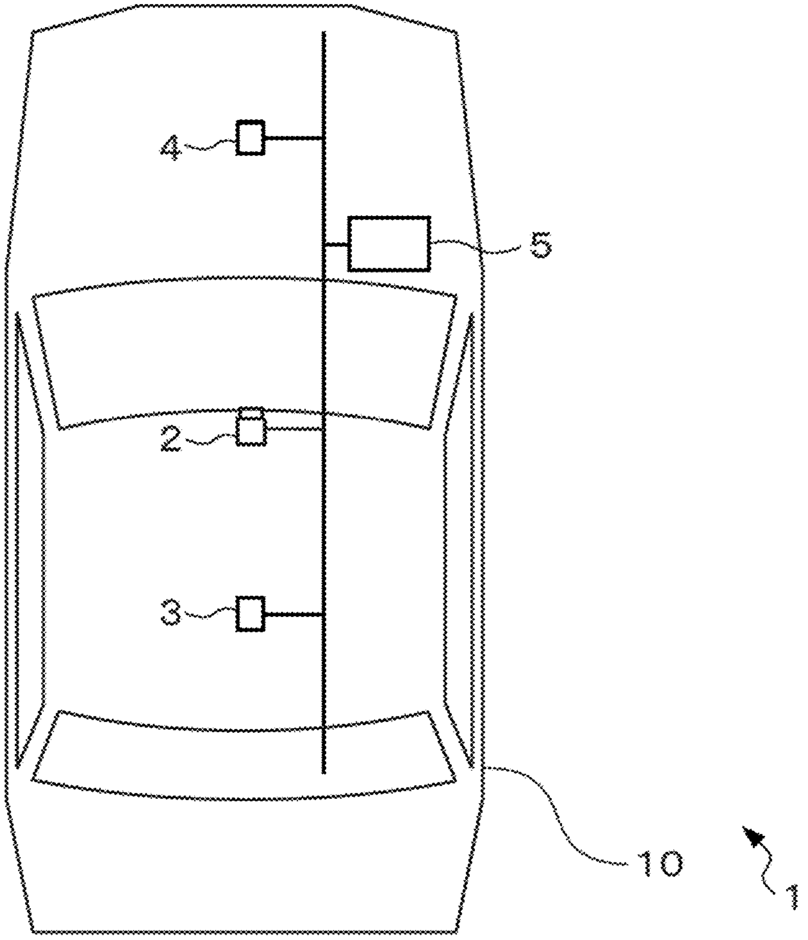
FIG. 1 schematically illustrates the configuration of a vehicle control system equipped with a vehicle controller.
Figure 2:
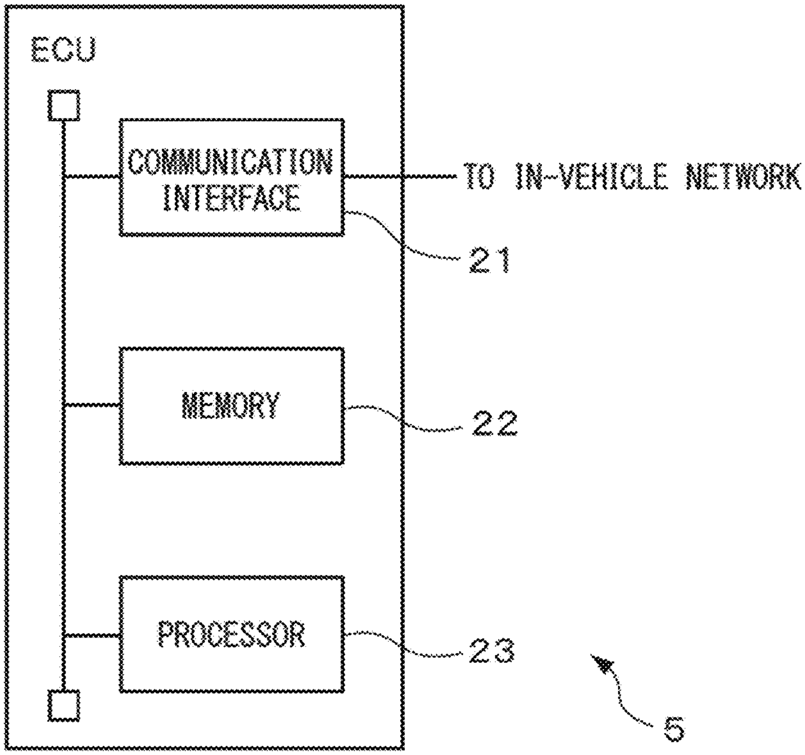
FIG. 2 illustrates the hardware configuration of an electronic control unit, which is an example of the vehicle controller.

FIG. 1 schematically illustrates the configuration of a vehicle control system equipped with the vehicle controller. FIG. 2 illustrates the hardware configuration of an electronic control unit, which is an embodiment of the vehicle controller. In the present embodiment, the vehicle control system 1, which is mounted on a vehicle 10 and controls the vehicle 10, includes a camera 2, a GPS receiver 3, a storage device 4, and an electronic control unit (ECU) 5, which is an example of the vehicle controller. The camera 2, the GPS receiver 3, and the storage device 4 are communicably connected to the ECU 5 via an in-vehicle network conforming to a standard such as a controller area network. The vehicle 10 is an example of a host vehicle. The vehicle control system 1 may further include a range sensor (not illustrated) that measures the distance from the vehicle 10 to an object in an area around the vehicle 10, such as LiDAR or radar.

The camera 2 generates an image representing an area around the vehicle 10. The camera 2 is mounted in the interior of the vehicle 10 so as to be oriented in a predetermined direction, e.g., to the front of the vehicle 10. The camera 2 takes pictures of a region around the vehicle 10, e.g., a region in front of the vehicle 10, every predetermined capturing period (e.g., 1/30 to 1/10 seconds), and generates images representing the front region. Images obtained by the camera 2 may be color or grayscale images. The vehicle 10 may be provided with multiple cameras taking pictures in different orientations or having different focal lengths.

Every time an image is generated, the camera 2 outputs the generated image to the ECU 5 via the in-vehicle network.

The GPS receiver 3 receives GPS signals from GPS satellites at predetermined intervals, and determines the position of the vehicle 10, based on the received GPS signals. The GPS receiver 3 outputs positioning information indicating the result of determination of the position of the vehicle 10 based on the GPS signals to the ECU 5 via the in-vehicle network at predetermined intervals. Instead of the GPS receiver 3, the vehicle 10 may include a receiver conforming to another satellite positioning system. In this case, the receiver determines the position of the vehicle 10.

The storage device 4, which is an example of a storage unit, includes, for example, a hard disk drive, a nonvolatile semiconductor memory, or an optical medium and an access device therefor. The storage device 4 stores map information, which includes, for example, information indicating road markings, such as lane lines or stop lines, and traffic signs in each road section included in a predetermined region represented in the map information as well as information indicating features around the road. The map information may further include information indicating the curvature and gradient of each road section.

The storage device 4 may further include a processor for executing, for example, a process to update the map information and a process related to a request from the ECU 5 to read out the map information. For example, every time the vehicle 10 moves a predetermined distance, the storage device 4 transmits a request to obtain map information to a map server, together with the current position of the vehicle 10, via a wireless communication terminal (not illustrated) mounted on the vehicle 10. The storage device 4 then receives map information on a predetermined region around the current position of the vehicle 10 from the map server via the wireless communication terminal. When a request from the ECU 5 to read out the map information is received, the storage device 4 cuts out that portion of the map information stored therein which includes the current position of the vehicle 10 and which represents a region smaller than the predetermined region, and outputs the cutout portion to the ECU 5 via the in-vehicle network.

The ECU 5 controls travel of the vehicle 10 according to a predetermined level of autonomous driving. The predetermined level of autonomous driving may be level 1 or a higher level of autonomous driving defined by the Society of Automotive Engineers (SAE).

As illustrated in FIG. 2, the ECU 5 includes a communication interface 21, a memory 22, and a processor 23. The communication interface 21, the memory 22, and the processor 23 may be configured as separate circuits or a single integrated circuit.

The communication interface 21 includes an interface circuit for connecting the ECU 5 to the in-vehicle network. Every time an image is received from the camera 2, the communication interface 21 passes the received image to the processor 23. Every time positioning information is received from the GPS receiver 3, the communication interface 21 passes the positioning information to the processor 23. In addition, the communication interface 21 passes map information read from the storage device 4 to the processor 23.

The memory 22, which is another example of a storage unit, includes, for example, volatile and nonvolatile semiconductor memories. The memory 22 stores various types of data used in a vehicle control process executed by the processor 23 of the ECU 5. For example, the memory 22 stores parameters of the camera 2 indicating the focal length, the angle of view, the orientation, and the mounted position; map information; and sets of parameters for specifying various classifiers used for detection and swaying determination of a cycle traveling in an area around the vehicle 10. In addition, the memory 22 temporarily stores images generated by the camera 2, the results of determination of the position of the vehicle by the GPS receiver 3, and various types of data generated during the vehicle control process.

The processor 23 includes one or more central processing units (CPUs) and a peripheral circuit thereof. The processor 23 may further include another operating circuit, such as a logic-arithmetic unit, an arithmetic unit, or a graphics processing unit. The processor 23 executes the vehicle control process on the vehicle 10.

Figure 3:
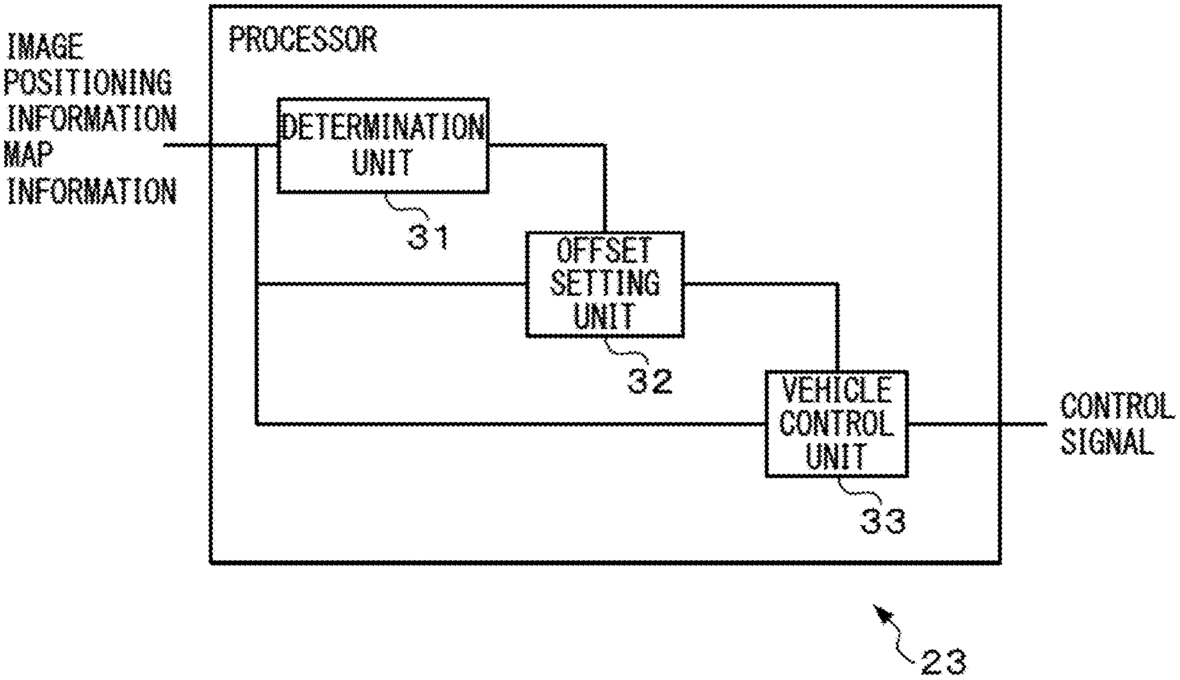
FIG. 3 is a functional block diagram of a processor of the electronic control unit, related to a vehicle control process.

FIG. 3 is a functional block diagram of the processor 23, related to the vehicle control process. The processor 23 includes a determination unit 31, an offset setting unit 32, and a vehicle control unit 33. These units included in the processor 23 are functional modules, for example, implemented by a computer program executed by the processor 23, or may be dedicated operating circuits provided in the processor 23.

The determination unit 31 detects a cycle traveling in an area around the vehicle 10, based on an image representing the area around the vehicle 10 generated by the camera 2. The determination unit 31 then determines whether the detected cycle represented in the image may exhibit swaying behavior.

In the present embodiment, every time the ECU 5 obtains an image from the camera 2, the determination unit 31 inputs the image into a classifier, thereby detecting a cycle traveling in an area around the vehicle 10. The cycle-detecting classifier is an example of the first classifier, and may be, for example, a deep neural network (DNN) having architecture of a convolutional neural network (CNN) type, such as Single Shot MultiBox Detector (SSD) or Faster R-CNN. Alternatively, the cycle-detecting classifier may be a DNN having an attention mechanism, such as Vision Transformer, or a classifier based on another machine learning algorithm other than a DNN, such as a support vector machine or an adaBoost classifier. Such a classifier is trained in advance with a large number of training images including images representing a cycle in accordance with a predetermined training algorithm, such as backpropagation, so as to detect a cycle from an image. The classifier outputs information for identifying an object region representing a cycle detected in the inputted image. The object region is, for example, a circumscribed rectangle of a cycle represented in the image.

When a cycle is detected from an image, the determination unit 31 inputs the object region representing the cycle into a classifier for determining whether the cycle may exhibit swaying behavior (hereafter also referred to simply as "sway"). The determination unit 31 may execute upsampling or downsampling of the object region representing the cycle so that the object region has a predetermined size, and then input the object region into the sway-determining classifier. This simplifies the configuration of the sway-determining classifier. When an object region representing a cycle is inputted, the sway-determining classifier outputs a confidence score indicating how likely it is that the cycle represented in the object region will exhibit swaying behavior. When the confidence score is higher than a predetermined threshold (e.g., 0.7 to 0.9), the determination unit 31 determines that the cycle may exhibit swaying behavior; when the confidence score is not higher than the threshold, the determination unit 31 determines that the cycle will not exhibit swaying behavior.

The sway-determining classifier is an example of the second classifier, and may be, for example, a DNN of a CNN type including, in order from the input side, one or more convolution layers, one or more fully-connected layers, and an output layer configured to execute a softmax operation or a sigmoid operation. Alternatively, the sway-determining classifier may be a DNN having an attention mechanism or a classifier based on another machine learning algorithm.

The sway-determining classifier is trained in advance with a large number of training images representing various cycles in accordance with a predetermined training algorithm so as to output a confidence score indicating how likely it is that a cycle represented in an object region will exhibit swaying behavior, based on a feature of the cycle or a feature of the cycle rider. For example, an elderly person or a child may not be able to ride a bicycle without swaying. Thus the sway-determining classifier is trained in advance so that a bicycle whose rider is an elderly person or a child will be given a high confidence score of swaying behavior. Further, a child's bicycle, whose rider is a child, may exhibit swaying behavior. A bicycle equipped with a child seat may also exhibit swaying behavior because of the difficulty in handling. Thus the sway-determining classifier is trained in advance so that a child's bicycle and a bicycle equipped with a child seat will also be given a high confidence score of swaying behavior. In contrast, a bicycle without a child seat whose rider is an adult but is not an elderly person is unlikely to exhibit swaying behavior. Thus the sway-determining classifier is trained in advance so that such a cycle will be given a low confidence score of swaying behavior.

When multiple cycles are detected from an image, the determination unit 31 inputs, for each detected cycle, an object region representing the cycle into the sway-determining classifier, thereby determining whether each detected cycle may exhibit swaying behavior. Alternatively, the sway-determining classifier may be configured so that multiple object regions can be inputted into the classifier simultaneously. For example, the sway-determining classifier may be configured so that object regions different from channel to channel are inputted. In this case, multiple object regions respectively representing the detected cycles are inputted into the sway-determining classifier simultaneously, and thereby the sway-determining classifier outputs a confidence score indicating how likely it is that one of the cycles will exhibit swaying behavior. In this case, the sway-determining classifier may be trained in advance so as to tend to determine that one of two or more cycles ridden by a parent (or parents) and a child (or children), respectively, may exhibit swaying behavior.

According to a modified example, a single classifier may be configured to detect a cycle from an image and to calculate a confidence score indicating how likely it is that the detected cycle will exhibit swaying behavior. The classifier according to the modified example is an example of the third classifier, and may be a DNN of a CNN type or having an attention mechanism, or a classifier based on another machine learning algorithm. In this case, the classifier outputs an object region representing a detected cycle and a confidence score of swaying behavior determined for the object region. In this case also, the determination unit 31 compares, for each object region, the confidence score of the object region with the threshold, thereby determining whether the cycle represented in the object region may exhibit swaying behavior.

The determination unit 31 notifies the offset setting unit 32 of the result of determination whether the detected cycle may exhibit swaying behavior and the position in the image of the object region representing the cycle.

The offset setting unit 32 sets a lateral offset distance to the detected cycle. In the present embodiment, the offset setting unit 32 sets, when it is determined that the detected cycle may exhibit swaying behavior, the offset distance to a greater value than when it is determined that the detected cycle will not exhibit swaying behavior.

For example, when the road being traveled by the vehicle 10 has a bicycle lane, the cycle is generally expected to travel inside the bicycle lane. Thus, in this case, the offset setting unit 32 sets an approach limit up to which the cycle can be approached to a position that is the offset distance away from the position of the cycle toward the lane of the vehicle (hereafter the "host vehicle lane"). The offset setting unit 32 determines whether the road being traveled by the vehicle 10 has a bicycle lane, by referring to the latest position of the vehicle 10 determined by the GPS receiver 3 and the map information. Alternatively, the offset setting unit 32 may determine whether the road being traveled by the vehicle 10 has a bicycle lane, by inputting an image generated by the camera 2 into a classifier that has been trained to detect a bicycle lane. In this case, the offset setting unit 32 can use, for example, a DNN for semantic segmentation, such as Fully Convolutional Network (FCN) or U-Net, as the classifier.

In addition, the offset setting unit 32 estimates the position of the detected cycle. Pixels of an image generated by the camera 2 correspond one-to-one to bearings from the camera 2; the bottom of an object region representing a cycle is assumed to correspond to the position where the cycle is on the road surface. Thus the offset setting unit 32 can estimate the distance and direction to the cycle relative to the position of the camera 2 at the time of image generation, based on the bottom position of the object region representing the cycle in the image and parameters of the camera 2, such as the height of the mounted position, the focal length, and the orientation of the camera 2. When the vehicle 10 is provided with a range sensor, the offset setting unit 32 may estimate the distance to the cycle to be a distance measured by the range sensor in the bearing corresponding to the object region representing the cycle. In addition, the offset setting unit 32 can estimate the position of the cycle in the world coordinate system, based on the distance and direction to the cycle relative to the position of the camera 2 as well as the position and travel direction of the vehicle 10 at the time of image generation. To detect the accurate position and travel direction of the vehicle 10, the offset setting unit 32 compares an image generated by the camera 2 with the map information. For example, assuming the position and orientation of the vehicle 10, the offset setting unit 32 projects features on or around the road detected from an image onto the map information or features on or around the road in the vicinity of the vehicle 10 represented in the map information onto the image. The features on or around the road may be, for example, road markings, such as lane lines or stop lines, curbstones, or various traffic signs. The offset setting unit 32 detects the position and orientation of the vehicle 10 for the case where the features detected from the image match those represented in the map information the best, as the accurate position and travel direction of the vehicle 10. In addition, the offset setting unit 32 detects a lane including the position of the vehicle 10 as the host vehicle lane being traveled by the vehicle 10.

The offset setting unit 32 uses the assumed position and orientation of the vehicle 10 and parameters of the camera 2, such as the focal length, the height of the mounted position, and the orientation, to determine the positions in the map or the image to which the features are projected. The offset setting unit 32 then calculates the degree of matching between the features on or around the road detected from the image and the corresponding features represented in the map (e.g., the inverse of the sum of squares of the distances between these features).

The offset setting unit 32 repeats the above-described processing while varying the assumed position and orientation of the vehicle 10. The offset setting unit 32 detects the position and orientation for the case where the degree of matching is a maximum, as the accurate position and travel direction of the vehicle 10.

The offset setting unit 32 inputs an image into a classifier that has been trained to detect a detection target feature from an image, thereby detecting the feature. As such a classifier, the offset setting unit 32 can use a classifier similar to that used for detecting a cycle or a bicycle lane.

Upon estimation of the position of the cycle, the offset setting unit 32 sets a position that is the offset distance away in the lateral direction from the estimated position toward the center of the host vehicle lane, as an approach limit to the cycle. As described above, the offset distance for the case where it is determined that the cycle may exhibit swaying behavior is set to a value (e.g., 1.5 m to 2 m) greater than the offset distance for the case where it is determined that the cycle will not exhibit swaying behavior (e.g., 1 m to 1.5 m).

When the road being traveled by the vehicle 10 does not have a bicycle lane, the offset setting unit 32 may also set an approach limit to a position that is the offset distance away from the position of the cycle toward the host vehicle lane. However when a bicycle lane starts from or ends at a position within a predetermined distance of the current position of the cycle along the road, the lateral position of the cycle may vary. Thus, when there is a change point where the presence or absence of a bicycle lane changes within a predetermined distance of the current position of the cycle, the offset setting unit 32 may set an approach limit to a position that is the offset distance plus a predetermined modification distance (e.g., 0.5 m) away from a lane line defining the host vehicle lane on the cycle side toward the host vehicle lane. The position of the lane line of the road being traveled by the vehicle 10 is identified by referring to the map information and the position of the vehicle 10 indicated by the latest positioning information.

When no cycle is detected around the vehicle 10, the offset setting unit 32 sets the position of a lane line defining the host vehicle lane or a position that is a predetermined distance (e.g., 0.1 to 0.5 m) away from the lane line toward the center of the host vehicle lane, as an approach limit, so that the vehicle 10 can travel along the center of the host vehicle lane.

The offset setting unit 32 notifies the vehicle control unit 33 of the set approach limit.

The vehicle control unit 33 controls travel of the vehicle 10 to keep at least the set offset distance from the cycle. To achieve this, the vehicle control unit 33 sets a planned trajectory along the host vehicle lane so as to be farther from the cycle than the approach limit notified by the offset setting unit 32 in a predetermined section in front of and behind the position of the cycle in the lengthwise direction of the road being traveled by the vehicle 10. The predetermined section is set so as not to be shorter than the distance required for the vehicle 10 to pass the cycle, depending on the relative speed and distance between the cycle and the vehicle 10. To this end, the vehicle control unit 33 can determine the relative speed between the cycle and the vehicle 10, based on changes in the distance between the camera 2 and the cycle at the times of generation of images by the camera 2. The distance between the camera 2 and the cycle is determined in a manner similar to that described in relation to the offset setting unit 32. The vehicle control unit 33 controls components of the vehicle 10 so that the vehicle 10 travels along the planned trajectory.

When a cycle is detected, the vehicle control unit 33 sets a planned trajectory according to a trajectory generation model obtained by learning past trajectories of the vehicle 10 passing a cycle during manual driving by the driver. The trajectory generation model is generated, for example, as an average of trajectories from when the distance to a cycle equals a predetermined distance until the vehicle 10 passes the cycle and proceeds a predetermined distance. Alternatively, the trajectory generation model may be configured by a DNN that has been trained to output a planned trajectory. In this case, the vehicle control unit 33 generates a planned trajectory by inputting the distance between the vehicle 10 and the cycle as well as the positions of the vehicle 10 and the cycle into the trajectory generation model. The vehicle control unit 33 then adjusts the generated planned trajectory so that the vehicle 10 will be farther from the cycle than the approach limit in the above-described predetermined section.

Upon setting a planned trajectory, the vehicle control unit 33 controls components of the vehicle 10 so that the vehicle 10 travels along the planned trajectory. To achieve this, the vehicle control unit 33 determines the steering angle of the vehicle 10 for the vehicle 10 to travel along the planned trajectory, based on the planned trajectory and the current position of the vehicle 10, and outputs a control signal depending on the steering angle to an actuator (not illustrated) that controls the steering of the vehicle 10. Specifically, when the current position of the vehicle 10 is on the planned trajectory, the vehicle control unit 33 determines the steering angle so that the vehicle moves along the planned trajectory. When the current position of the vehicle 10 is away from the planned trajectory, the vehicle control unit 33 determines the steering angle so that the vehicle approaches the planned trajectory. The vehicle control unit 33 determines the position and travel direction of the vehicle 10 at the time of generation of the latest image in a manner similar to that described in relation to the offset setting unit 32. The vehicle control unit 33 can estimate the current position of the vehicle 10 by correcting the position and travel direction of the vehicle 10 at the time of image generation, using, for example, the acceleration and yaw rate of the vehicle 10 from the time of image generation to the current time.

In the case where the level of autonomous driving applied to the vehicle 10 is a level corresponding to driving assistance at which the driver generally operates the steering wheel, the vehicle control unit 33 may assist the driver in driving by controlling the steering to keep at least the offset distance from the cycle when the lateral position of the vehicle 10 becomes closer to the cycle than the approach limit.

In the case where the level of autonomous driving applied to the vehicle 10 is a level at which the speed of the vehicle 10 is also controlled, the vehicle control unit 33 may further control the speed of the vehicle 10, depending on whether the cycle may exhibit swaying behavior. For example, when it is determined that the cycle may exhibit swaying behavior, the vehicle control unit 33 may decelerate the vehicle 10 so that the speed of the vehicle 10 is less than or equal to a predetermined speed (e.g., 20 km/h to 30 km/h). In addition, when the vehicle 10 precedes the cycle, the vehicle control unit 33 may accelerate the vehicle 10.

Figure 4A:
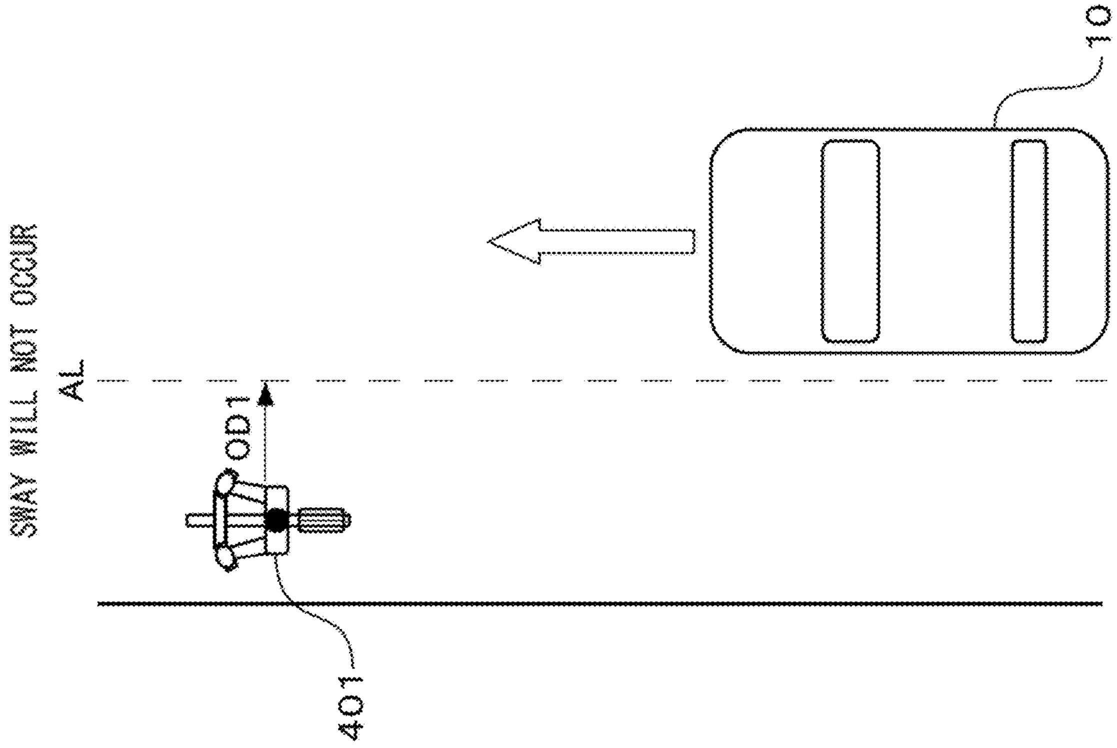
FIG. 4A illustrates an example of setting of an offset distance.
Figure 4B:
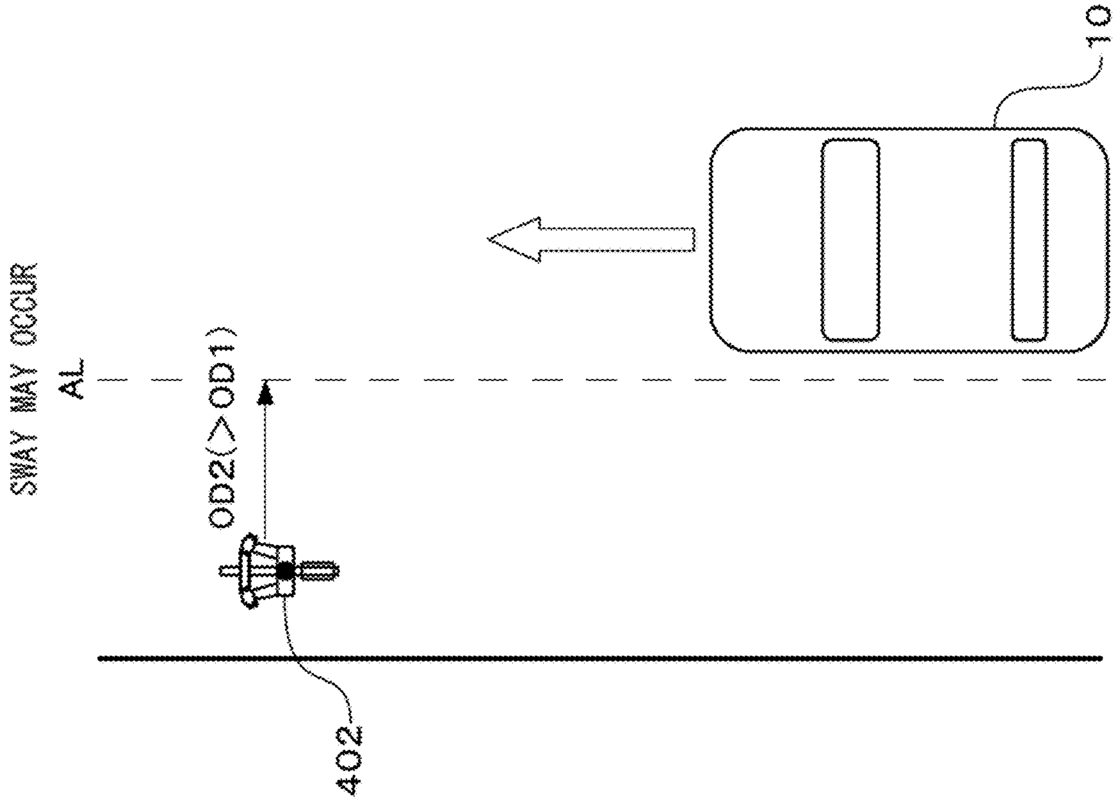
FIG. 4B illustrates another example of setting of an offset distance.

FIGS. 4A and 4B illustrate examples of setting of the offset distance. In the example illustrated in FIG. 4A, a cycle 401 is ridden by an adult and it is determined that the cycle 401 will not exhibit swaying behavior. Thus the lateral offset distance is set to a relatively small value OD1, and a position that is the offset distance OD1 away from the cycle 401 is set as an approach limit AL. The vehicle 10 is controlled to travel at a position farther from the cycle 401 than the approach limit AL.

In contrast, in the example illustrated in FIG. 4B, a cycle 402 is ridden by a child, and thus it is determined that the cycle 402 may exhibit swaying behavior. Thus the lateral offset distance is set to a value OD2 greater than the offset distance OD1 illustrated in FIG. 4A, and a position that is the offset distance OD2 away from the cycle 402 is set as an approach limit AL. Thus the vehicle 10 is controlled to travel at a position relatively far from the cycle 402.

Figure 5:
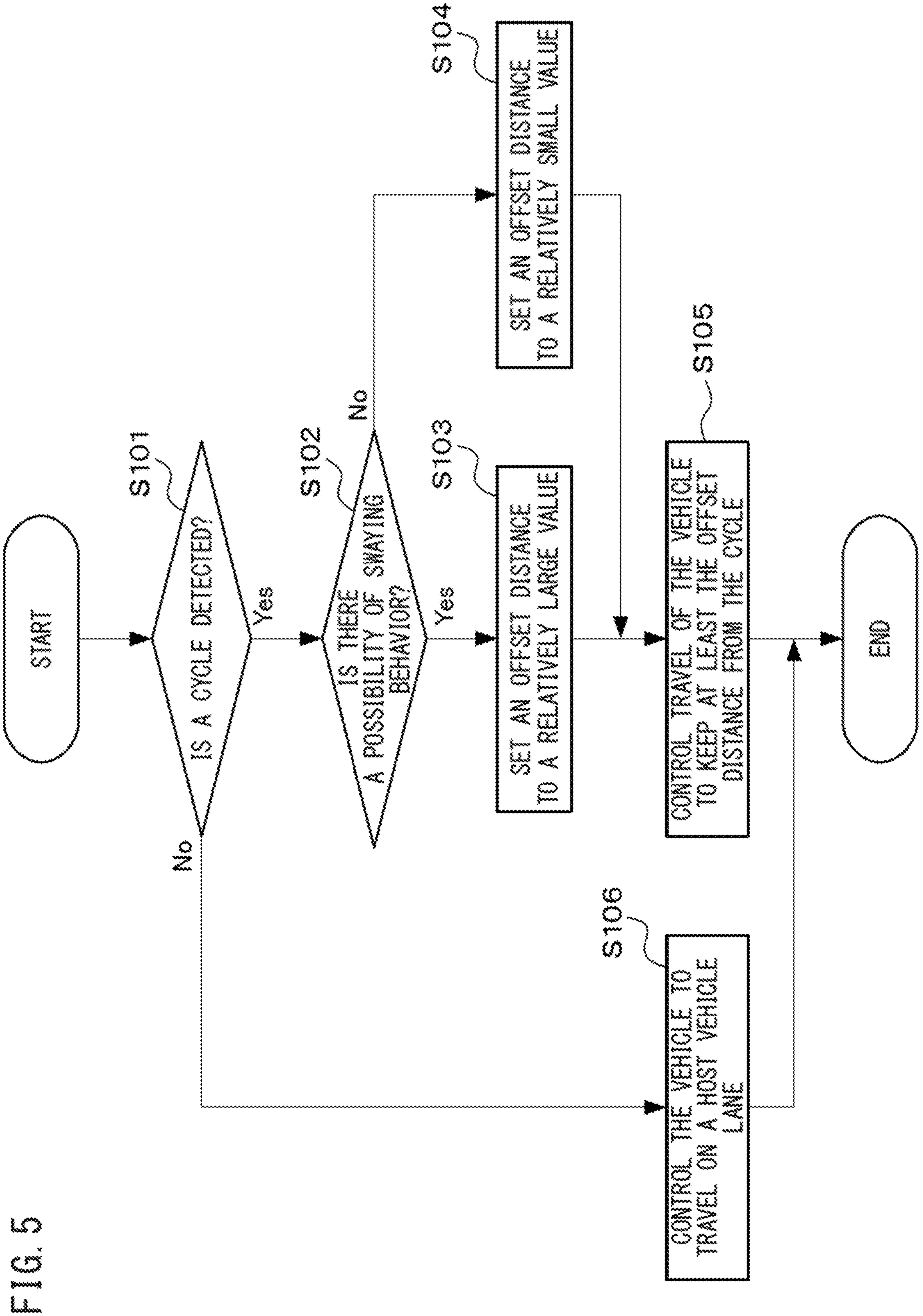
FIG. 5 is an operation flowchart of the vehicle control process.

FIG. 5 is an operation flowchart of the vehicle control process executed by the processor 23. The processor 23 executes the vehicle control process at predetermined intervals in accordance with the operation flowchart described below.

The determination unit 31 of the processor 23 determines whether a cycle traveling in an area around the vehicle 10 is detected (step S101). When a cycle is detected (Yes in step S101), the determination unit 31 determines whether the cycle may exhibit swaying behavior (step S102).

When the cycle may exhibit swaying behavior (Yes in step S102), the offset setting unit 32 of the processor 23 sets a lateral offset distance to the cycle to a relatively large value (step S103). When the cycle will not exhibit swaying behavior (No in step S102), the offset setting unit 32 sets a lateral offset distance to the cycle to a relatively small value (step S104).

After step S103 or S104, the vehicle control unit 33 of the processor 23 controls travel of the vehicle 10 to keep at least the offset distance from the cycle (step S105). When no cycle is detected in step S101 (No in step S101), the vehicle control unit 33 controls the vehicle 10 so that the vehicle 10 travels on a host vehicle lane (step S106). After step S105 or S106, the processor 23 terminates the vehicle control process.

As has been described above, the vehicle controller determines whether a cycle may exhibit swaying behavior from an image, and thus can set a lateral offset distance appropriately even at timing when the cycle is not actually exhibiting swaying behavior.

According to a modified example, the offset setting unit 32 may adjust the offset distance, depending on a topographic feature of the road being traveled by the vehicle 10. For example, when the road being traveled by the vehicle 10 is a slope, in particular, an upward slope, the possibility that a cycle traveling in an area around the vehicle 10 will sway is high. Thus, when the road being traveled by the vehicle 10 is a slope, the offset setting unit 32 adjusts the offset distance, which is set depending on the possibility that swaying behavior will be exhibited, so as to be further increased by a predetermined distance (e.g., 0.3 m to 0.6 m). The offset setting unit 32 determines whether the road being traveled by the vehicle 10 is a slope, by referring to the latest position of the vehicle 10 determined by the GPS receiver 3 and information on the gradient of the road included in the map information.

When the road being traveled by the vehicle 10 is a curve, the offset setting unit 32 may similarly adjust the offset distance, which is set depending on the possibility that swaying behavior will be exhibited, so as to be further increased by a predetermined distance. In this case also, the offset setting unit 32 determines whether the road being traveled by the vehicle 10 is a curve, by referring to the latest position of the vehicle 10 determined by the GPS receiver 3 and information on the curvature of the road included in the map information. Alternatively, the offset setting unit 32 may detect a lane line from an image generated by the camera 2, and determine that the road being traveled by the vehicle 10 is a curve, when the detected lane line can be approximated with a curve.

The sway-determining classifier used by the determination unit 31 may be configured so that topographic information representing a topographic feature of the road being traveled by the vehicle 10 is inputted, together with an object region representing a detected cycle. For example, the topographic information is represented as a matrix or a vector having different values depending on a topographic feature, such as a curve, a straight line, a slope, or a flat road, and is inputted into the sway-determining classifier as a channel different from the channel into which an object region is inputted. The sway-determining classifier includes a layer that executes a fully-connected operation between a channel into which an object region is inputted and a channel into which topographic information is inputted, thereby being trained in advance so as to output a confidence score indicating how likely it is that the cycle will exhibit swaying behavior with the topographic information taken into account. This makes the classifier tend to determine that the cycle may exhibit swaying behavior, when the road being traveled by the vehicle 10 has a topographic feature that is likely to cause a cycle to sway (e.g., a slope or a curve).

The computer program that achieves the functions of the processor 23 of the ECU 5 according to the above-described embodiment or modified examples may be provided in a form recorded on a computer-readable portable storage medium, such as a semiconductor memory, a magnetic medium, or an optical medium.

As described above, those skilled in the art may make various modifications according to embodiments within the scope of the present disclosure.

What is claimed is:

1. A vehicle controller comprising:

a processor configured to:

detect a cycle traveling in an area around a vehicle, based on an image representing the area around the vehicle, determine whether the cycle may exhibit swaying behavior, based on an object region representing the cycle detected in the image, set an offset distance to the cycle in a direction perpendicular to a lengthwise direction of a road being traveled by the vehicle so that the offset distance when the cycle may exhibit swaying behavior is greater than the offset distance when the cycle will not exhibit swaying behavior, and control travel of the vehicle to keep at least the set offset distance from the cycle.

2. The vehicle controller according to claim 1, wherein the processor detects the object region representing the cycle in the image by inputting the image into a first classifier that has been trained to detect the cycle from the image, and determines whether the cycle may exhibit swaying behavior by inputting the object region into a second classifier that has been trained to determine the possibility that the cycle will exhibit swaying behavior.

3. The vehicle controller according to claim 2, wherein the processor determines whether the cycle may exhibit swaying behavior by inputting the object region and information representing a topographic feature of the road being traveled by the vehicle into the second classifier.

4. The vehicle controller according to claim 1, wherein the processor detects the object region representing the cycle in the image and determines whether the cycle may exhibit swaying behavior, by inputting the image into a third classifier that has been trained to detect the cycle represented in the image and to determine the possibility that the cycle will exhibit swaying behavior.

5. The vehicle controller according to claim 1, wherein the processor adjusts the offset distance, based on a topographic feature of the road being traveled by the vehicle.

6. The vehicle controller according to claim 5, wherein the processor adjusts the offset distance so as to be increased by a predetermined distance, when the road being traveled by the vehicle is a slope or a curve.

7. A method for vehicle control, comprising:

detecting a cycle traveling in an area around a vehicle, based on an image representing the area around the vehicle;

determining whether the cycle may exhibit swaying behavior, based on an object region representing the cycle detected in the image;

setting an offset distance to the cycle in a direction perpendicular to a lengthwise direction of a road being traveled by the vehicle so that the offset distance when the cycle may exhibit swaying behavior is greater than the offset distance when the cycle will not exhibit swaying behavior; and controlling travel of the vehicle to keep at least the set offset distance from the cycle.

8. A non-transitory recording medium that stores a computer program for vehicle control, the computer program causing a processor mounted on a vehicle to execute a process comprising:

detecting a cycle traveling in an area around the vehicle, based on an image representing the area around the vehicle;

determining whether the cycle may exhibit swaying behavior, based on an object region representing the cycle detected in the image;

setting an offset distance to the cycle in a direction perpendicular to a lengthwise direction of a road being traveled by the vehicle so that the offset distance when the cycle may exhibit swaying behavior is greater than the offset distance when the cycle will not exhibit swaying behavior; and controlling travel of the vehicle to keep at least the set offset distance from the cycle.

* * * * *